3,840,554
2-AMINO-1-(2-IMIDAZOLIN-2-YL)-2-
IMIDAZOLINES
Raymond R. Wittekind, Morristown, and John Shavel,
Jr., Mendham, N.J., assignors to Warner-Lambert Company, Morris Plains, N.J.
No Drawing. Continuation-in-part of application Ser. No.
6,639, Jan. 28, 1970, now Patent No. 3,666,767, dated
May 30, 1972. This application May 15, 1972, Ser.
No. 253,361
Int. Cl. C07d 49/34
U.S. Cl. 260—309.6       46 Claims

ABSTRACT OF THE DISCLOSURE

The present invention relates to 2-amino-1-(2-imidazolin-2-yl)-2-imidazolines, the free base of which has the following structural formulas:

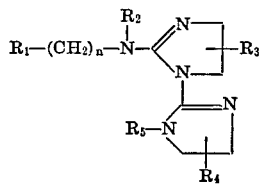 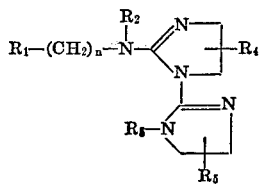

wherein
$R_1$ is hydrogen, lower alkyl, cycloalkyl, aryl, substituted aryl, heterocyclic, substituted heterocyclic or aryloxy;
$R_2$ is hydrogen, lower alkyl, aryl and substituted aryl; or $R_1$ and $R_2$ taken together with the nitrogen atom to which they are attached form a heterocyclic ring;
$R_3$ and $R_4$ are hydrogen, lower alkyl, aryl, or substituted aryl;
$R_5$ is hydrogen, lower alkyl, aryl or substituted aryl;
$n$ is an integer from 0 to 10.
The compounds of this invention are useful as anti-arrhythmic agents as well as antibacterial agents.

---

This application is a continuation-in-part of our copending application, U.S. Ser. No. 6,639, filed Jan. 28, 1970, now U.S. Pat. No. 3,666,767, issued May 30, 1972.

The present invention relates to 2-amino-1-(2-imidazolin-2-yl)-2-imidazolines having the following structural formulas:

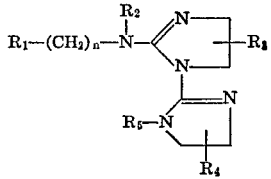 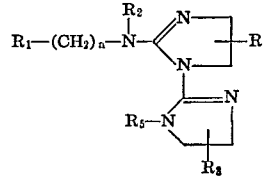

wherein
$R_1$ is hydrogen, lower alkyl, cycloalkyl, heterocyclic, substituted heterocyclic, aryl, substituted aryl, or aryloxy;
$R_2$ is hydrogen, lower alkyl, aryl, substituted aryl; or
$R_1$ and $R_2$ taken together with the nitrogen atom to which they are attached form a heterocyclic ring, for example, a 5- or 6-membered ring;
$R_3$ and $R_4$ are hydrogen, lower alkyl, aryl or substituted aryl;
$R_5$ is hydrogen, lower alkyl, aryl or substituted aryl;
$n$ is an integer from 0 to 10.

In the definitions for $R_1$, $R_2$, $R_3$, $R_4$, and $R_5$, the term "lower alkyl' includes lower aliphatic hydrocarbons having 1 to 4 carbon atoms in the carbon chain. It includes straight chain as well as branched chain radicals. The term also includes, for example, methyl, ethyl, propyl, isopropyl, butyl, isobutyl and the like. The term "cycloalkyl" encompasses saturated monocyclic groups having from 3 to 8 carbon atoms, such as cyclopropyl, cyclobutyl, cyclopentyl, cyclohexyl, cycloheptyl, and cyclooctyl. The term "heterocyclic" encompasses the monocyclic 5- and 6-membered hetero rings having at least one hetero atom in the ring which may be either nitrogen, oxygen or sulfur. Representative heterocyclics falling within this definition are, for example, aziridinyl, azetidinyl, pyrrolyl, pyrrolidinyl, morpholino, thienyl, furyl, pyridyl, piperidyl, indolyl, and the like. Additionally, these 5- and 6-membered heterocyclics may have further substituents in their ring portions by groups such as hydrogen, halogen, lower alkyl and lower alkoxy. The term "aryl" denotes a monocyclic or bicyclic hydrocarbon radical, preferably of 6 to 10 carbon atoms, such as for example, phenyl, naphthyl and the like. The term "substituted aryl" as used herein includes aryl as defined above in which one or more of the hydrogen atoms of the aryl portion have been substituted by groups such as, halogen, hydroxyl, lower alkyl, trifluoromethyl, amino, substituted amino or lower alkoxy. X, in the formulas below, includes anions such as the halides, for example, fluoride, chloride, iodide, bromide, or other anions such as, sulfate, nitrate, phosphate, maleate, fumarate and the like.

The definitions for $R_1$, $R_2$, $R_3$, $R_4$ and $R_5$, and $n$ as used hereinafter have the same meanings as defined above.

The compounds of this invention exhibit anti-arrhythmic activity, for example, at a dosage of about 2 to 3 mg./kg., body weight in a mammal such as, cats, dogs, monkeys, and the like. In experimentally induced arrhythmia, such as those induced by ouabain, at a dosage of 2 to 3 mg./kg., the compounds of this invention are capable of arresting such arrhythmia. Generally speaking, the compounds of this invention are useful in conditions associated with cardiac arrhythmia. A dosage level of about 1 to 10 mg., several times daily is recommended. This dosage regimen can be varied according to body weight, sex and species of the mammal being treated.

Among the dosage forms which can be used to administer these compounds are, for example, tablets, powders, elixirs, suspensions and the like. These dosage forms are formulated by procedures known to the pharmacist's art.

All the compounds of this invention also exhibit antibacterial activity against gram positive cocci, such as *Staphylococcus aureus* or gram negative bacilli, such as *E. coli*. To use the compounds as anti-bacterials, they are formulated from 1 to 10% by weight with a dermatologically acceptable vehicle, such as talc, petrolatum and applied liberally to the site infected with the susceptible bacteria.

The preferred genus has the following structural formula:

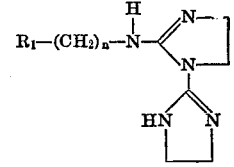

wherein $n$ is 0 or 1; $R_1$ is hydrogen, n-alkyl of 2 to 16 carbon atoms, monocyclicalkyl of 3 to 12 carbon atoms, naphthyl or phenethyl or phenyl wherein the phenyl ring may be monosubstituted with lower alkoxy of 1 to 4 carbon atoms, hydroxy, lower alkyl of 1 to 4 carbon atoms, halo, nitro, trifluoromethyl or sulfamoyl or disubstituted with halo, lower alkoxy of 1 to 4 carbon atoms or hydroxy and when $n$ is 0, $R_1$ is adamantanyl, phenylcyclopropyl, diphenylmethyl, alpha, alpha-dimethylphenethyl, para-biphenyl or the group A—$CH_2CH_2$ wherein A is hydroxy, lower alkoxy of 1 to 4 carbon atoms, mercapto, lower alkylthio of 1 to 4 carbon atoms, methoxyethoxymethyl, hydroxyethylamino, lower alkoxymethyl of 1 to 4 carbon atoms, sulfomethyl or HOOC—$(CH_2)_8$ or a pharmaceutically acceptable acid addition salt thereof.

$R_2$=hydrogen; a lower alkyl group such as methyl and the like; an aromatic such as phenyl and the like.

A=hydrogen; a lower dialkyl group such as dimethyl and the like; an oxygen atom such as that of a carbonyl group.

$n$=0 to 16.

X=An anionic group such as chloride, bromide, iodide, maleate, fumarate or the like.

These compounds are prepared by the processes outlined below.

A.

$R_1-(CH_2)_n-\overset{\overset{A}{\|}}{C}-\overset{\overset{R_2}{|}}{N}-H$ + [2-(methylthio)-imidazoline] + [2-(methylthio)-imidazoline]·HX ⟶

2  3  4

[product 1]

B.

$R_1-(CH_2)_n-\overset{\overset{A}{\|}}{C}-\overset{\overset{R_2}{|}}{N}-H·HX$ + 2 [imidazoline-SCH_3] ⟶ 1

5  3

C.

$R_1-(CH_2)_n-\overset{\overset{A}{\|}}{C}-\overset{\overset{R_2}{|}}{N}-H$ + 2 [imidazoline-SCH_3·HX] + $(C_2H_5)_3N$ ⟶ 1

2  4  5

D.

$R_1-(CH_2)_n-\overset{\overset{A}{\|}}{C}-\overset{\overset{R_2}{|}}{N}-H$ + [bis-imidazoline $\overset{+}{N}(C_2H_5)_3 X^-$]·$CH_3SH$·HX ⟶ 1

2  6

E.

$R_1-(CH_2)_n-\overset{\overset{A}{\|}}{C}-\overset{\overset{R_2}{|}}{N}-H$ + [bis-imidazoline-SCH_3]·HX ⟶ 1

2  7

F.

$R_1-(CH_2)_n-\overset{\overset{A}{\|}}{C}-\overset{\overset{R_2}{|}}{N}-H·HX$ + [bis-imidazoline-SCH_3]·$H_2O$ ⟶ 1

5  8

G.

$R_1-(CH_2)_n-\overset{\overset{A}{\|}}{C}-\overset{\overset{R_2}{|}}{N}-H$ + [bis-imidazoline-SCH_3]·$H_2O$ ⟶

2  8

[product 9]

H.

$R_1-(CH_2)_n-\overset{\overset{A}{\|}}{C}-\overset{\overset{R_2}{|}}{N}-H$ + [bis-imidazoline-SCH_3]·$CH_3SH$·HX ⟶ 1

2  10 where $R_1$, $R_2$, A, $n$ and X have the meaning described above.

2-propanol, acetonitrile and water are useful solvents for these processes.

The amines 2 and their acid-addition salts are available from Aldrich Chemical Company and can be prepared by methods outlined in Synthetic Organic Chemistry by R. B. Wagner and H. D. Zook, John Wiley and Sons, Inc., New York, N.Y., 1953, p. 653.

The 2-(methylthio)-2-imidazolines 3 and 4 are prepared according to methods described in S R. Aspinall and E. J. Bianco, *J. Org. Chem.*, 73, 602 (1951); W. Wilson, *J. Chem. Soc.*, 1389 (1955); and A. L. Langis and F. Herr, *Can.*, 736, 494 (June 14, 1966); *C. A.*, 65, 12212 (1966).

Triethyl[1-(2-imidazolin-2-yl) - 2 - imidazolin - 2 - yl] ammonium iodide hydroiodide methanethiol (6), 1-(2-imidazolin-2-yl)-2-(methylthio) - 2 - imidazoline hydroiodide (7), 1-(2-imidazolin - 2 - yl) - 2 - (methylthio)-2-imidazoline hydrate (8) and 1-(2-imidazolin-2-yl) - 2 - (methylthio) - 2 - imidazoline hydroiodide methanethiol (10) are prepared by the processes outlined below where X has the same meaning as above. 2-propanol and acetonitrile are useful solvents.

I.

2 [imidazoline-SCH_3]·HX + $(C_2H_5)_3N$ ⟶ [imidazoline-$\overset{+}{N}(C_2H_5)_3 X^-$]·$CH_3SH$·HX

4  11  6

J.

[imidazoline-SCH_3]·HX + [imidazoline-SCH_3] ⟶

4  3

[imidazoline-SCH_3]·HX  +  [imidazoline-SCH_3]·HX·$CH_3SH$

7  10

↓

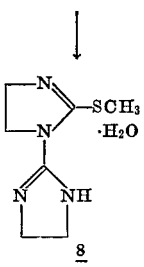

To further illustrate the practice of this invention, the following examples are included:

EXAMPLE 1

2-[(3,4-dimethoxyphenethyl)amino]-1-(2-imidazolin-2-yl)-2-imidazoline hydroiodide A solution of 3,4-dimethoxyphenethylamine (1.81 g., 0.0100 mol), 2-(methylthio)-2-imidazoline hydroiodide (4.88 g., 0.0200 mol), triethylamine (1.01 g., 0.0100 mol), and freshly distilled (from calcium hydride) 2-propanol (50 ml.) was heated under reflux for one hour while a slow stream of nitrogen was passed through the reaction mixture. The reaction mixture was allowed to cool to room temperature. The solid was collected and recrystallized from 95% 2-propanol-water; yield, 0.90 g. (24%) of the imidazoline hydroiodide, m.p. 199.0–201.0° C.

*Analysis.*—For $C_{16}H_{24}IN_5O_2$: Calcd.: C, 43.16; H, 5.43; I, 28.50; N, 15.73. Found: C, 43.45; H, 5.45; I, 28.63; N, 15.43.

EXAMPLE 2

2-[(cyclopropylmethyl)amino]-1-(2-imidazolin-2-yl)-2-imidazoline hydroiodide

A solution of cyclopropylmethylamine (143 g., 0.0200 mol), triethyl[1-(2-imidazolin-2-yl)-2-imidazolin-2-yl]ammonium iodide hydroiodide methanethiol (9.86 g., 0.0182 mol) and freshly distilled (from calcium hydride) 2-propanol (30 ml.) was heated under reflux for one hour and allowed to cool to room temperature. The solid was collected and recrystallized from 90% 2-propanol-water; yield 2.7 g. (35%) of the imidazoline hydroiodide, m.p. 238.0–239.0° C. dec.

*Analysis.*—For $C_{10}H_{18}IN_5$: Calcd.: C, 35.82; H, 5.37; I, 37.92; N, 20.90. Found: C, 35.72; H, 5.40; I, 37.87; N, 20.84.

EXAMPLE 3

2-[(4-chlorophenethyl)amino]-1-(2-imidazolin-2-yl)-2-imidazoline hydroiodide

A solution of 2-(4-chlorophenethyl)amine (3.83 g., 0.0250 mol), triethyl[1-(2-imidazolin-2-yl)-2-imidazolin-2-yl]ammonium iodide hydroiodide methanethiol (12.2 g., 0.0226 mol) and freshly distilled (from calcium hydride) 2-propanol (100 ml.) was heated under reflux for seven minutes and allowed to cool to room temperature. The solid was collected and recrystallized from 95% 2-propanol-water; yield 4.83 g. (46.0%) of the imidazoline hydroiodide, m.p. 197.0–199.0° C. dec.

*Analysis.*—For $C_{14}H_{19}ClIN_5$: Calcd.: C, 40.07; H, 4.56; Cl, 8.45; I, 30.24; N, 16.69. Found: C, 40.21; H, 4.65; Cl, 8.65; I, 30.10; N, 16.81.

EXAMPLE 4

2-[(3,4-dihydroxyphenethyl)amino -1-(2-imidazolin-2-yl)-2-imidazoline hydrochloride A solution of 3-hydroxytyramine hydrochloride (5.69 g., 0.0300 mol), 2-(methylthio)-2-imidazoline (6.96 g., 0.0600 mol) and 2-propanol (distilled from calcium hydride, 10 ml.) was heated under reflux for one hour while a stream of nitrogen was slowly bubbled through the solution. The reaction mixture was allowed to cool to room temperature. The solid was collected and recrystallized from 95% 2-propanol-water; yield 2.37 g. (27.0%) of the imidazoline, m.p. 233.0–234.0° C. dec.

*Analysis.*—For $C_{14}H_{20}ClN_5O_2$: Calcd: C, 51.61; H, 6.19; Cl, 10.88; N, 21.50. Found: C, 51.53; H, 6.18; Cl, 10.86; N, 21.60.

EXAMPLE 5

2-anilino-1-(2-imidazolin-2-yl)-2-imidazoline

A solution of fresh distilled aniline (9.3 g., 0.10 mol), 2-(methylthio)-2-imidazoline hydroiodide (24.4 g., 0.100 mol), 2-(methylthio)-2-imidazoline (11.6 g., 0.100 mol) and 2-propanol (distilled from calcium hydride, 100 ml.) was heated under reflux for three hours while a slow stream of nitrogen was bubbled through the solution. The reaction mixture was concentrated. The residue was treated with 20% sodium hydroxide solution and extracted with methylene chloride (5× 125 ml.-portions). The organic extracts were washed with water, dried over anhydrous sodium sulfate, filtered and evaporated under reduced pressure. The amorphous residual solid was extracted with boiling ether (4× 750 ml.-portions). Evaporation of the solvent followed by recrystallization of the residue from benzene gave 5.2 g. (27%) of the imidazoline, m.p. 175.5–176.5° C. dec.

*Analysis.*—for $C_{12}H_{15}N_5$: Calcd.: C, 62.86; H, 6.60; N, 30.55. Found: C, 63.13; H, 6.67; N, 30.43.

EXAMPLE 6

1-(2-imidazolin-2-yl)-2-(phenethylamino)-2-imidazoline hydroiodide

A solution of 2-phenethylamine (12.1 g., 0.100 mol), 2-(methylthio)-2-imidazoline hydroiodide (24.4 g., 0.100 mol), 2-(methylthio)-2-imidazoline (11.6 g., 0.100 mol) and freshly distilled (from calcium hydride) 2-propanol (150 ml.) was heated under reflux for three hours while a slow stream of nitrogen was passed through the solution. The reaction mixture was concentrated to about one-third of its original volume. The solid was collected and recrystallized from 2-propanol; yield 6.81 g. (18.0%) of the imidazoline; m.p. 169.5–170.5° C.

*Analysis.*—For $C_{19}H_{15}IN_5$: Calcd.: C, 43.65; H, 5.23; I, 32.94; N, 18.18. Found: C, 43.95; H, 5.26; I, 33.00; N, 18.27.

EXAMPLE 7

2-(benzylamino)-1-(2-imidazolin-2-yl)-2-imidazoline hydroiodide

A solution of benzylamine (10.7 g., 0.100 mol), 2-(methylthio)-2-imidazoline hydroiodide (24.4 g., 0.100 mol), 2-(methylthio)-2-imidazoline (11.6 g., 0.100 mol) and freshly distilled (from calcium hydride) 2-propanol (100 ml.) was heated under reflux for two hours while a slow stream of nitrogen was passed through the reaction mixture. The solution was concentrated to one-fourth of its original volume and allowed to stand at room temperature for four days. 2-propanol (150 ml.) was added and the precipitate was collected. Recrystallization from 2-propanol gave 6.50 g. (17.0%) of the imidazoline hydroiodide; m.p. 187.0–189.0° C.

*Analysis.*—For $C_{13}H_{18}IN_5$: Calcd.: C, 42.06; H, 4.89; I, 34.19; N, 18.87. Found: C, 42.31; H, 5.01; I, 34.28; N, 19.13.

EXAMPLE 8

1-(2-imidazolin-2-yl)-2-[(trans-2-phenylcyclopropyl)amino]-2-imidazoline maleate A solution of trans-2-phenylcyclopropylamine hydrochloride (9.35 g., 0.0550 mol), 2-methylthio)-2-imidazoline (12.8 g., 0.110 mol) and freshly distilled (from calcium hydride) 2-propanol (125 ml.) was heated under reflux for five hours and then concentrated under reduced pressure. The residue was partitioned between 20% potassium hydroxide solution and methylene chloride.

The organic extracts were dried over anhydrous sodium sulphate, filtered and evaporated. Trituration of the residue with ether-pentane gave a white powder (5.47 g.). A portion of the white powder (4.01 g.) was dissolved in 2-propanol (30 ml.) and added to a solution of maleic acid (1.73 g.) in 2-propanol (30 ml.). The precipitate was collected and recrystallized from 2-propanol; yield 4.07 g. (15.0%) of the imidazoline maleate; m.p. 190.0–191.0° C.

*Analysis.*—For $C_{19}H_{23}N_5O_4$: Calcd.: C, 59.12; H, 6.01; N, 18.17; O, 16.60. Found: C, 59.04; H, 6.21; N, 18.36; O, 16.60.

EXAMPLE 9

2-{[2-(4-benzoyl-2,6-dimethylphenoxy)ethyl]amino}-1-(2-imidazolin-2-yl)-2-imidazoline hydrochloride A solution of 4-(2-aminoethoxy)-3,5-dimethylbenzophenone hydrochloride (6.12 g., 0.0200 mol), 2-(methylthio)-2-imidazoline (4.64 g., 0.0400 mol) and freshly distilled (from calcium hydride) 2-propanol (50 ml.) was heated under reflux for 22 hours while a slow stream of nitrogen was bubbled through the reaction mixture. Ether was added to the reaction mixture at room temperature. The solid was collected and washed with cold ether-2-propanol. Recrystallization from 2-propanol afforded 1.30 g. (15.0%) of the imidazoline hydrochloride, m.p. 213.0–214.5° C. dec.

*Analysis.*—For $C_{23}H_{28}ClN_5O_2$: Calcd.: C, 62.51; H, 6.39; Cl, 18.02; N, 15.85; O, 7.24. Found: C, 62.37; H, 6.53; Cl, 17.77; N, 16.16; O, 7.50.

EXAMPLE 10

2-(n-decylamino)-1-(2-imidazolin-2-yl)-2-imidazoline hydroiodide

A solution of n-decylamine (6.61 g., 0.0423 mol), 1-(2-imidazolin-2-yl) - 2 - (methylthio)-2-imidazoline hydroiodide (13.1 g., 0.420 mol) and freshly distilled (from calcium hydride) 2-propanol (55 ml.) was heated under reflux for five hours and then concentrated to about two-thirds of the original volume. The precipitate was collected and recrystallized from benzene; yield 3.54 g. (20.0%) of the imidazoline hydroiodide; m.p. 129.0–131.0° C. dec.

*Analysis.*—For $C_{16}H_{31}IN_5$: Calcd.: C, 45.61; H, 7.65; I, 30.12; N, 16.62. Found: C, 45.47; H, 7.72; I, 30.12; N, 16.87.

EXAMPLE 11

2-(cyclopropylamino)-1-(2-imidazolin-2-yl)-2-imidazoline hydroiodide

A solution of cyclopropylamine (2.86 g., 0.0500 mol), triethyl[1-(2-imidazolin - 2 - yl)-2-imidazolin-2-yl]ammonium iodide hydroiodide methanethiol (27.1 g., 0.0500 mol) and freshly distilled (from calcium hydride) 2-propanol (250 ml.) was refluxed for one hour while a slow stream of nitrogen was bubbled through the solution. The reaction mixture was allowed to cool to room temperature. The precipitate was collected and recrystallized from 95% 2-propanol-water; yield 6.13 g. (39.0%) of the imidazoline hydroiodide, m.p. 264.0–266.0° C. dec.

*Analysis.*—For $C_9H_{16}IN_5$: Calcd.: C, 33.66; H, 5.02; I, 39.51; N, 21.81. Found: C, 33.80; H, 5.17; I, 39.39; N, 21.80.

EXAMPLE 12

1-(2-imidazolin-2-yl)-2-(n-propylamino)-2-imadazoline hydroiodide

A solution of n-propylamine (2.60 g., 0.0440 mole), triethyl[1-(2-imidazolin - 2 - yl)-2-imidazolin-2-yl]ammonium iodide hydroiodide methanethiol (21.7 g., 0.0400 mole) and distilled (from calcium hydride) 2-propanol (200 ml.) was heated under reflux for one and a half hours while a slow stream of nitrogen was bubbled through the reaction mixture. The reaction mixture was allowed to cool to room temperature. The precipitate was collected and recrystallized from 2-propanol; yield 6.38 g. (50.0%) of the imidazoline hydroiodide, m.p. 222.0°–224.0°.

*Analysis.*—Calcd. for $C_9H_{19}IN_5$: C, 33.45; H, 5.61; I, 39.27; N, 21.67. Found: C, 33.66; H, 5.82; I, 39.32; N, 21.69.

EXAMPLE 13

2-[(3-hydroxy-4-methoxyphenethyl)amino]-1-(2-imidazolin-2-yl)-2-imidazoline hydroiodide A solution of 5-(2-aminoethyl)-2-methoxyphenol (5.12 g., 0.0310 mole), triethyl[1-(2-imidazolin-2-yl)-2-imidazolin-2-yl]ammonium iodide hydroiodide methanethiol (16.2 g., 0.0300 mole) and distilled (from calcium hydride) 2-propanol (110 ml.) was heated under reflux for 1.5 hours while a slow stream of nitrogen was bubbled through the reaction mixture. The resulting precipitate was collected and recrystallized from 2-propanol; yield 5.14 g. (40.0%) of the imidazoline hydroiodide, m.p. 177.0–179.0° dec.

*Analysis.*—Calcd. for $C_{15}H_{22}IN_5O_2$: C, 41.78; H, 5.14; I, 29.43; N, 16.24; O, 7.42. Found: C, 42.03; H, 5.17; I, 29.38; N, 16.16; O, 7.39.

EXAMPLE 14

2-[(4-hydroxy-3-methoxyphenethyl)amino]-1-(2-imidazolin-2-yl)-2-imidazoline hydroiodide A solution of 4-(2-aminoethyl)-2-methoxyphenol (5.12 g., 0.0310 mole), triethyl[1-(2-imidazolin-2-yl)-2-imidazolin-2-yl]ammonium iodide hydroiodide methanethiol (16.2 g., 0.0300 mole) and distilled (from calcium hydride) 2-propanol (100 ml.) was heated under reflux for 1.5 hours. The resulting precipitate was collected and recrystallized from 2-propanol; yield 7.57 g. (59.0%) of the imidazoline hydroiodide, m.p. 182°–184° dec.

*Analysis.*—Calcd. for $C_{15}H_{22}IN_5O_2$: C, 41.78; H, 5.14; I, 29.43; N, 16.24. Found: C, 42.03; H, 5.29; I, 29.24; N, 16.04.

EXAMPLE 15

2-(adamantylamino)-1-(2-imidazolin-2-yl)-2-imidazoline hydroiodide

A solution of 1-adamantanamine (4.76 g., 0.0315 mole), 1 - (imidazolin-2-yl)-2-(methylthio)-2-imidazoline hydroiodide (9.37 g., 0.0300 mole) and distilled (from calcium hydride) 2-propanol (120 ml.) was heated under reflux for five hours while a steady stream of nitrogen was passed through the reaction mixture. The resultant precipitate was collected and recrystallized from 2-propanol; yield 3.55 g. (92.0%) of the imidazoline hydroiodide, m.p. 239.0–241.0° dec.

*Analysis.*—Calcd. for $C_{16}H_{26}IN_5$: C, 46.27; H, 6.31; I, 30.56; N, 16.86. Found: C, 46.36; H, 6.42; I, 30.72; N, 16.87.

EXAMPLE 16

1-(2-imidazolin-2-yl)-2-[(3-phenylpropyl)amino]-2-imidazoline hydroiodide

A solution of 3-phenylpropylamine (4.67 g., 0.0346 mole), 1-(2-imidazolin-2-yl) - 2 - (methylthio)-2-imidazoline hydroiodide (18.8 g., 0.0346 mole) and freshly distilled (from calcium hydride) acetonitrile (55 ml.) was heated under reflux for three hours while a steady stream of nitrogen was passed through the reaction mixture. The precipitate was collected and recrystallized from 2-propanol to give the imidazoline hydroiodide (5.88 g., 42.0%); m.p. 131.0–132.0° dec.

*Analysis.*—Calcd. for $C_{15}H_{12}IN_5$: C, 45.12; H, 5.55; I, 31.78; N, 17.54. Found: C, 45.15; H, 5.43; I, 31.81; N, 17.83.

EXAMPLE 17

1-(2-imidazolin-2-yl)-2-(α,α,α-trifluoro-*m*-toluidine-2-imidazoline

A solution of 3-aminobenzotrifluoride (24.2 g., 0.150 mole), 1 - (2-imidazolin-2-yl)-2-(methylthio)-2-imidazoline (46.8 g., 0.150 mole) and acetonitrile (distilled from calcium hydride, 1500 ml.) was heated under reflux for 72 hours while a steady stream of nitrogen was passed through the solution. The reaction mixture was concentrated to about 100 ml. and methylene chloride (100 ml.) was added. The solid was collected. The filtrate was evaporated. The resulting oil was dissolved in 2N sodium hydroxide solution (100 ml.) and extracted with methylene chloride (3× 100 ml.) and chloroform (6× 100 ml.). The combined extracts were dried over anhydrous magnesium sulfate, filtered and evaporated. The residual gum was triturated with 2-propanol and then recrystallized from 2-propanol; yield 18.9 g. (42.5%) of the imidazolin-2-ylimidazoline, m.p. 215.0–216.0° dec.

*Analysis.*—Calcd. for $C_{13}H_{14}F_3N_5$: C, 52.52; H, 4.75; F, 19.17; N, 23.56. Found: C, 52.69; H, 4.86; F, 18.92; N, 23.42.

EXAMPLE 18

1-(2-imidazolin-2-yl)-2-(veratrylamino)-2-imidazoline hydroiodide

A solution of 3,4-dimethoxybenzylamine (8.35 g., 0.500 mole), 1-(2-imidazolin-2-yl) - 2 - (methylthio)-2-imidazoline hydroiodide (15.6 g., 0.500 mole) and acetonitrile (615 ml.) was heated under reflux for 2 hours while a steady stream of nitrogen was passed through the reaction mixture. The reaction mixture was stirred at room temperature for 2 hours and the precipitate was collected. Recrystallization from 2-propanol (2 times) gave the imidazolin-2-yl-imidazoline, m.p. 192.0–193.5° dec.

*Analysis.*—Calcd. for $C_{15}H_{22}IN_5O_2$: C, 41.78; H, 5.14; I, 29.43; N, 16.24; O, 7.42. Found: C, 41.76; H, 5.12; I, 29.55; N, 16.08; O, 7.35.

EXAMPLE 19

2-(n-heptylamino)-1-(2-imidazolin-2-yl)-2-imidazoline hydroiodide

A solution of *n*-heptylamine (5.82 g., 0.0510 mole), 1-(2 - imidazolin-2-yl)-(2-methylthio)-2-imidazoline hydroiodide (15.6 g., 0.0500 mole) and acetonitrile (45 ml.) was heated under reflux for four hours while a steady stream of nitrogen was passed through the reaction mixture. The precipitate was collected and recrystallized from benzene yielding the imidazoline hydroiodide (7.6 g., 40%), m.p. 142.0°–144.0° dec.

*Analysis.*—Calcd. for $C_{13}H_{26}IN_5$: C, 41.17; H, 6.91; I, 33.46; N, 18.46. Found: C, 41.05; H, 7.05; I, 33.50; N, 18.42.

EXAMPLE 20

2-(cyclododecylamino)-1-(2-imidazolin-2-yl)-2-imidazoline hydroiodide

A solution of cyclododecylamine (18.5 g., 0.101 mole), 1-(2-imidazolin-2-yl)-2-(methylthio) - 2 - imidazoline hydroiodide (31.2 g., 0.100 mole) and distilled (from calcium hydride) acetonitrile (180 ml.) was heated under reflux for four hours while a steady stream of nitrogen was passed through the reaction mixture. The precipitate was collected and recrystallized from 2-propanol; yield 18.8 g. (42.0%) of the imidazoline hydroiodide, m.p. 233.0°–234.0° dec.

*Analysis.*—Calcd. for $C_{18}H_{34}IN_5$: C, 48.32; H, 7.66; I, 28.36; N, 15.65. Found: C, 48.42; H, 7.84; I, 28.46; N, 15.42.

EXAMPLE 21

2-[(2,6-dichlorobenzyl)amino]-1-(2-imidazolin-2-yl)-2-imidazoline hydroiodide A solution of 2,6-dichlorobenzylamine (14.1 g., 0.0801 mole), 1-(2-imidazolin-2-yl) - 2 - (methylthio)-2-imidazoline hydroiodide (25.0 g., 0.0801 mole) and 2-propanol (distilled from calcium hydride, 400 ml.) was heated under reflux for 75 minutes while a steady stream of nitrogen was bubbled through the reaction medium. The reaction mixture was allowed to stand at room temperature for 2 hours. The precipitate was collected and recrystallized from 2-propanol (3 times); yield 13.7 g. (38.7%) of the benzylaminoimidazoline, m.p. 223.0–224.0° dec.

*Analysis.*—Calcd. for $C_{13}H_{16}Cl_2IN$: C, 35.48; H, 3.66; Cl, 16.11; I, 28.83; N, 15.91. Found: C, 35.44; H, 3.75; Cl, 16.35; I, 28.71; N, 15.76.

EXAMPLE 22

2-(3,4-dimethoxyanilino)-1-(2-imidazolin-2-yl)-2-imidazoline hydroiodide

A solution of 3,4 - dimethoxyaniline (16.1 g., 0.105 mole), triethyl[1 - (2-imidazolin-2-yl)-2-imidazolin-2-yl] ammonium iodide hydroiodide methanethiol (56.8 g., 0.105 mole) and 2-propanol (distilled from calcium hydride) (800 ml.) was boiled for 2 hours and allowed to stand at room temperature overnight. The solid was collected and recrystallized from 3% water-ethanol, 2-propanol and acetonitrile (2 times); yield 6.3 g. (14%) of the anilinoimidazoline, m.p. 235.0–236.0° dec.

*Analysis.*—Calcd. for $C_{14}H_{21}IN_5O_2$: C, 40.30; H, 4.83; I, 30.41; N, 16.78; O, 7.67. Found: C, 40.13; H, 4.86; I, 30.30; N, 16.90; O, 7.75.

EXAMPLE 23

1-(2-imidazolin-2-yl)-2-(2-naphthylamino)-2-imidazoline.

A solution of 2-aminonaphthalene (21.5 g., 0.150 mole), triethyl[1 - (2 - imidazolin - 2 - yl)-2-imidazolin-2-yl] ammonium iodide hydroiodide methanthiol (40.6 g., 0.0750 mole), 1-(2-imidazoline-2-yl)-2-(methylthio)-2 - imidazoline hydroiodide (23.4 g., 0.0750 mole) and 2-propanol (distilled from calcium hydride, 500 ml.) was heated under reflux for five hours while a steady stream of nitrogen was passed through the reaction mixture. The reaction mixture was evaporated under reduced pressure and the residue was distributed between 2N sodium hydroxide solution (300 ml.) and methylene chloride (400 ml.). The aqueous phase was extracted with methylene chloride (2× 200 ml.). The organic extracts were stirred with charcoal and filtered through Supercel. The filtrate was evaporated and the residue was recrystallized from 2-propanol; yield 20.9 g. (69.8%) of the imidazoline, m.p. 199.0–201.0°.

*Analysis.*—Calcd. for $C_{16}H_{17}N_5$: C, 68.79; H, 6.13; N, 25.07. Found: C, 69.01; H, 6.11; N, 25.23.

EXAMPLE 24

2-(n-heptadecylamino)-1-(2-imidazolin-2-yl)-imidazoline hydroiodide

A solution of n-heptadecylamine (12.9 g., 0.0510 mole), 1-(2-imidazolin-2-yl)-2-(methylthio)-2-imidazoline hydroiodide (15.6 g., 0.0500 mole) and acetonitrile (50 ml.) was heated under reflux for three hours while a steady stream of nitrogen was passed through the reaction mixture. The precipitate was collected and recrystallized from benzene to give the imidazoline hydroiodide (10.6 g., 49.0%), m.p. 103.0°–105.0° dec.

*Analysis.*—Calcd. for $C_{23}H_{46}IN_5$: C, 53.17; H, 8.92; I, 24.43; N, 13.48. Found: C, 53.00; H, 9.16; I, 24.40; N, 13.62.

EXAMPLE 25

2-(n-butylamino)-1-(2-imidazolin-2-yl)-2-imidazoline hydroiodide

A solution of n-butylamine (3.70 g., 0.0510 mole), 1-(2-imidazol - 2 - yl)-2-(methylthio)-2-imidazoline hydroiodide methanethiol (18.0 g., 0.0500 mole) and acetonitrile (50 ml.) was heated under reflux for three hours while a steady stream of nitrogen was passed through the reaction mixture. The precipitate was collected and recrystallized from 2-propanol to give the imidazoline hydroiodide (1.85 g., 10.0%), m.p. 189.0°–191.0° dec.

*Analysis.*—Calcd. for $C_{10}H_{20}IN_5$: C, 35.62; H, 5.98; I, 27.63; I, 37.63; N, 20.77. Found: C, 35.47; H, 6.12; I, 37.70; N, 20.65.

EXAMPLE 26

2-(cyclododecylmethylamino)-1-(2-imidazolin-2-yl)-imidazoline hydroiodide

A solution of N-methylcyclododecylamine (39.5 g., 0.200 mole), 1 - (2 - imidazolin-2-yl)-2-(methylthio)-2-imidazoline hydroiodide (62.5 g., 0.200 mole) and acetonitrile (250 ml.) was heated under reflux for five hours while a steady stream of nitrogen was passed through the reaction mixture. The precipitate was collected and recrystallized from acetonitrile; yield 23.8 g. (26.0%) of the imidazoline hydroiodide m.p. 215.0°–216.0° dec.

*Analysis.*—Calcd. for $C_{19}H_{36}IN_5$: C, 49.46; H, 7.86; I, 27.50; N, 15.18. Found: C, 49.48; H, 7.89; I, 27.54; N, 15.35.

EXAMPLE 27

1-(2-imidazolin-2-yl)-2-(*o*-toluidino)-2-imidazoline hydroiodide

A solution of *o*-toluidine (12.8 g., 0.120 mole), 1-(2-imidazolin-2-yl)-2-(methylthio) - 2 - imidazoline hydroiodide (37.4 g.) and acetonitrile (700 ml.) was heated under reflux for 22 hours while a steady stream of nitrogen was bubbled through the reaction mixture. The reaction mixture was concentrated to about one-half of its original volume and the solid was collected. Two recrystallizations from acetonitrile gave 10.4 g. (23.3%) of the imidazoline, m.p. 246.0–248.0° dec.

*Aanlysis.*—Calcd. for $C_{13}H_{18}IN_5$: C, 42.06; H, 5.01; I, 34.19; N, 18.87. Found: C, 42.15; H, 4.93; I, 34.15; N, 18.81.

EXAMPLE 28

2-[(4-hydroxy-3-methoxybenzyl)amino]-1-(2-imidazolin-2-yl)-2-imidazoline hydroiodide A solution of 4-hydroxy-3-methoxybenzylamine (7.65 g., 0.0500 mole), 1-(2-imidazolin-2-yl)-2-(methylthio)-2-imidazoline hydroiodide (15.6 g., 0.0500 mole) and acetonitrile (250 ml.) was heated under reflux for 2 hours while a steady stream of nitrogen was passed through the reaction mixture. The solution was concentrated to a final volume of 100 ml. and allowed to cool to room temperature. The solid was collected and recrystallized (2 times) from acetonitrile; yield 7.79 g. (37.2%) of the imidazoline, m.p. 184.0–185.0° dec.

*Analysis.*—Calcd. for $C_{14}H_{20}IN_5O_2$: C, 40.30; H, 4.83; I, 30.41; N, 16.78; O, 7.67. Found: C, 40.50; H, 4.85; I, 30.28; N, 16.72; O, 7.89.

EXAMPLE 29

2-[(4-biphenyl)amino]-1-(2-imidazolin-2-yl)-2-imidazoline

A solution of 4-aminobiphenyl (16.9 g., 0.100 mole), 1 - (2 - imidazolin-2-yl)-(2-methylthio)-2-imidazoline hydroiodide (31.2 g., 0.100 mole) and acetonitrile (500 ml.) was heated under reflux for five hours while a steady stream of nitrogen was passed through the solution. The reaction mixture was evaporated; the residual oil was dissolved in 0.5N sodium hydroxide solution (300 ml.) and extracted with methylene chloride and the chloroform. The organic extracts were dried over anhydrous sodium sulfate. The filtrate was treated with Darco and refiltered. Evaporation of the solvent followed by trituration with acetone and recrystallization from acetone, 2-propanol and benzene gave 11.4 g. (37.4%) of the imidazoline, m.p. 182.0–183.5°.

*Analysis.*—Calcd. for $C_{18}H_{19}N_5$: C, 70.80; H, 6.27; N, 22.93. Found: C, 70.53; H, 6.25; N, 22.89.

EXAMPLE 30

2-(*p*-hydroxyanilino)-1(2-imidazolin-2-yl)-imidazoline hydroiodide

A solution of *p*-aminophenol (6.54 g., 0.0600 mole), 1-(2-imidazolin-2-yl)-2-(methylthio)-2-imidazoline hydroiodide (18.7 g., 0.0600 mole) and 2-propanol (distilled from calcium hydride, 150 ml.) was heated under reflux for four hours while a steady stream of nitrogen was bubbled through the reaction mixture. The reaction mixture was allowed to cool to room temperature. The precipitate was collected and recrystallized two times) from methanol; yield 7.10 g. (31.7%) of the imidazoline, m.p. 262.0–264.0° dec.

*Analysis.*—Calcd. for $C_{12}H_{16}IN_5O$: C, 38.62; H, 4.32; I, 34.00; N, 18.77; O, 4.29. Found: C, 38.61; H, 4.20; I, 34.05; N, 18.87; O, 4.13.

EXAMPLE 31

2-[(benzoylmethyl)amino]-1-(2-imidazolin-2-yl) 2-imidazoline hydrochloride

A solution of 2-aminoacetophenone hydrochloride (17.2 g., 0.100 mole), 1,(2-imidazolin - 2 - yl) - 2 - (methylthio) - 2 - imidazoline hydrate (20.2 g., 0.100 mole) and acetonitrile (500 ml.) was heated under reflux for 2 hours while a stream of nitrogen was passed through the reaction mixture. The reaction mixture was allowed to cool to room temperature. The precipitate was collected and recrystallized (2 times) from acetonitrile-water; yield 6.17 g. (20.0%) of the imidazoline, m.p. 183.0–184.0°.

*Analysis.*—Calcd. for $C_{14}H_{18}ClN_5O$: C, 54.63; H, 5.89; Cl, 11.52; N, 22.75; O, 5.20. Found: C, 54.64; H, 5.88; Cl, 11.52; N, 23.03; O, 4.95.

EXAMPLE 32

2-[(α,α-dimethylphenethyl)amino]-1-(2-imidazolin-2-yl)-2-imidazoline hydroiodide A solution of α,α - dimethylphenethylamine (22.4 g., 0.15 mole), 1-(2-imidazolin - 2 - yl) - 2 - (methylthio)-2-imidazoline, hydroiodide (46.6 g., 0.15 mole) and acetonitrile (375 ml.) was heated under reflux with stirring for 18 hours while a steady stream of nitrogen was passed through the reaction mixture. The reaction mixture was allowed to cool to room temperature. The solid was collected and recrystallized from 2-propanol; yield 17.4 g. (27.1%) of the imidazoline, m.p. 161.0–163.0° dec.

*Analysis.*—Calcd. for $C_{16}H_{24}IN_5$: C, 46.50; H, 5.85; I, 30.70; N, 16.95. Found: C, 46.70; H, 5.90; I, 30.62; N, 17.03.

EXAMPLE 33

α-{[1-(2-imidazolin-2-yl)-2-imidazolin-2-yl]amino}-p-toluenesulfonamide hydrochloride A solution of p-aminomethylbenzenesulfonamide hydrochloride (22.2 g., 0.100 mole), 1-(2-imidazolin-2-yl)-2-(methylthio) - 2 - imidazoline hydrate (20.2 g., 0.100 mole) and 2-propanol (600 ml.) was heated under reflux for four hours while a steady stream of nitrogen was passed through the reaction mixture. The solution was allowed to cool to room temperature. The precipitate was collected and recrystallized from methanol; yield 9.6 g. (27%) of the imidazoline, m.p. 203.0–204.°.

*Analysis.*—Calcd. for $C_{13}H_{19}ClN_6O_6S$: C, 43.51; H, 5.34; Cl, 9.88; N, 23.42; O, 8.92; S, 8.94. Found: C, 43.39; H, 5.53; Cl, 10.15; O, 9.12; S, 8.71.

EXAMPLE 34

2-[(2-ethoxyethyl)amino]-1-(2-imidazolin-2-yl)-2-imidazoline hydroiodide

A solution of 2-ethoxyethylamine (6.2 g., 0.070 mole), 1-(2-imidazolin - 2 - yl) - 2 - (methylthio) - 2 - imidazoline hydroiodide (22 g., 0.070 mole) and 2-propanol (250 ml.) was heated under reflux for 0.5 hours while a steady stream of nitrogen was passed through the solution. The reaction mixture was allowed to cool to room temperature. The solid was collected and recrystallized from methanol; yield 12.3 g. (51.0%) of the imidazoline, m.p. 179–180°.

*Analysis.*—Calcd. for $C_{10}H_{20}IN O_5$: C, 34.01; H, 5.71; I, 35.93; N, 19.83; O, 4.53. Found: C, 34.04; H, 5.70; I, 36.02; N, 20.07; O, 4.82.

EXAMPLE 35

2-amino-1-(2-imidazolin-2-yl)-2-imidazoline hydroiodide

A mixture of 1-(2-imidazolin - 2 - yl) - 2 - (methylthio)-2-imidazoline hydrate (20.2 g., 0.100 mole), ammonium iodide (14.5 g., 0.100 mole) and 2-propanol (500 ml.) was heated to boiling and then under reflux for 15 minutes. The solution was allowed to cool to room temperature and was stirred at this temperature for 5 days. The precipitate was collected, washed wth 2-propanol and recrystallized from ethanol; yield 6.8 g. (24%) of the imidazoline, m.p. 159–160°.

*Analysis.*—Calcd. for $C_6H_{12}IN_5$: C, 25.64; H, 4.30; I, 45.15; N, 24.91. Found: C, 25.63; H, 4.24; I, 44.92; N, 24.95.

EXAMPLE 36

2-{[2-(ethylthio)ethyl]amino}-1-(2-imidazolin-2-yl)-2-imidazoline hydrochloride

A solution of 2-(ethylthio)-ethylamine hydrochloride (13.6 g., 0.0900 mole), 1-(2-imidazolin-2-yl)-2-(methylthio) - 2 - imidazoline hydrate (18.2 g., 0.0900 mole) and 2-propanol (450 ml.) was heated under reflux for 1 hour while a steady stream of nitrogen was passed through the reaction mixture. The residue obtained by evaporation of the solvent under reduced pressure was triturated with acetone. The solid was recrystallized from acetonitrile (twice); yield 7.14 g.; (29.0%) of the imidazoline, m.p. 159–160°.

*Analysis.*—Calcd. for $C_{10}H_{20}ClN_5S$: C, 43.23; H, 7.26; Cl, 12.76; N, 25.21; S, 11.54. Found: C, 43.16; H, 7.24; Cl, 12.51; N, 24.98; S, 11.71.

EXAMPLE 37

2-{[1-(2-imidazolin-2-yl)-2-imidazolin-2-yl]amino} ethanethiol hydrochloride

A solution of 2-aminoethanethiol hydrochloride (9.08 g., 0.0800 mole), 1 - (2 - imidazolin - 2 - yl)-2-(methylthiol) - 2 - imidazoline hydrate (16.2 g., 0.0800 mole) and 2-propanol (400 ml.) was heated under reflux for 1 hour while a steady stream of nitrogen was passed through the medium. The reaction mixture was allowed to cool to room temperature. The solid was collected and recrystallized from 2-propanol; yield 10.4 g. (53.0%) of the imidazoline, m.p. 179–180°.

*Analysis.*—Calcd. for $C_8H_{16}ClN_5S$: C, 38.47; H, 6.46; Cl, 14.19; N, 28.11; S, 12.84. Found: C, 38.36; H, 6.55; Cl, 14.00; N, 28.17; S, 13.10.

EXAMPLE 38

1-(2-imidazolin-2-yl)-2-{[3-(2-methoxyethoxy) propyl]amino}-2-imidazoline hydroiodide A solution of 3-(2-methoxyethoxy)-propylamine (10.6 g., 0.0800 mole), 1-(2-imidazolin - 2 - yl)-2-(methylthio)-2-imidazoline hydroiodide (24.9 g., 0.0800 mole) and 2-propanol (400 ml.) was heated under reflux for 45 minutes while a stream of nitrogen was passed through the solution and then allowed to cool to room temperature. The solid was collected and recrystallized from 2-propanol; yield 17.0 g. (54%) of the imidazoline, m.p. 126–128°.

*Analysis.*—Calcd. for $C_{12}H_{24}IN_5O_2$: C, 36.28; H, 6.09; I, 31.94; N, 17.63. Found: C, 36.06; H, 5.92; I, 31.94; N, 17.76.

EXAMPLE 39

2-({2-[(2-hydroxyethyl)amino]ethyl}amino)-1-(2-imidazolin-2-yl)-2-imidazoline dihydroiodide A solution of 2-(2-aminoethylamino)ethanol (6.24 g., 0.0600 mole), 1-(2-imidazolin - 2 - yl)-2-(methylthio)-2-imidazoline hydroiodide (18.7 g., 0.0600 mole), 50% hydriodic acid (15.4 g., 0.0600 mole) and 2-propanol (300 ml.) was heated under reflux for one hour while a steady stream of nitrogen was passed through the reaction mixture. The solution was allowed to cool to room temperature. The solid was collected and recrystallized from 2-propanol-water; yield 14.4 g. (49%) of the imidazoline dihydroiodide, m.p. 152–153°.

*Analysis.*—Calcd. for $C_{10}H_{22}I_2N_6O$: C, 24.21; H, 4.47; I, 51.16; N, 16.94; O, 3.32. Found: C, 24.32; H, 4.43; I, 51.37; N, 16.90; O, 3.27.

EXAMPLE 40

2-[(2-hydroxyethyl)amino]-1-(2-imidazolin-2-yl)-2-imidazoline hydroiodide

A solution of 2-aminoethanol (4.88 g., 0.0800 mole), 1-(2-imidazolin - 2 - yl) - 2 - (methylthio)-2-imidazoline hydroiodide (25.0 g., 0.0800 mole) and 2-propanol (400 ml.) was heated under reflux for one hour and allowed to stand at room temperature for 18 hours. A stream of nitrogen was bubbled through the reaction mixture during this time. The precipitate was collected and recrystallized from 2-propanol; yield 9.50 g. (37%) of the imidazoline hydroiodide, m.p. 137–140°.

*Analysis.*—Calcd. for $C_8H_{16}IN_5O$: C, 29.55; H, 4.96; I, 39.03; N, 21.54; O, 4.92. Found: C, 29.57; H, 4.89; I, 38.96; N, 21.50; O, 4.86.

EXAMPLE 41

1-(2-imidazolin-2-yl)-2-[(3-isopropoxypropyl)amino]-2-imidazoline hydroiodide

A solution of 3-isopropoxypropylamine (7.00 g., 0.0600 mole), 1-2-imidazolin-2-yl)-2-methylthio)-2-imidazoline hydroiodide (18.7 g., 0.0600 mole) and 2-propanol (300 ml.) was heated under reflux for two hours. A steady stream of nitrogen was passed through the solution during this time. The reaction mixture was allowed to cool to room temperature and the precipitate was collected. Recrystallization from 2-propanol gave 5.29 g., (22%) of the imidazoline hydroiodide, m.p. 120–122°.

*Analysis.*—Calcd. for $C_{12}H_{22}IN_5O$: C, 37.80; H, 6.34; I, 33.29; N, 18.37; O, 4.20. Found: C, 37.69; H, 6.36; I, 33.55; N, 18.49; O, 4.47.

EXAMPLE 42

3-{[1-(2-imidazolin-2-yl)-2-imidazolin-2-yl]amino} propanesulfonic acid hemihydrate A solution of 3-aminopropanesulfonic acid (10.0 g., 0.0720 mole), 1-(2-imidazolin-2-yl)-2-(methylthio)-2-imidazoline hydrate (14.5 g., 0.0720 mole), acetonitrile (500 ml.) and water (100 ml.) was heated under reflux for 22 hours while a steady stream of nitrogen was passed through the reaction medium. The reaction mixture was allowed to cool to room temperature. The solid was collected and recrystallized from water (2 times); yield 15.5 g. (79%) of the imidazoline as the hemihydrate, m.p. 28°–281° dec.

*Analysis.*—Calcd. for $C_9H_{17}N_5O_3S \cdot \frac{1}{2}H_2O$: C, 38.02; H, 6.38; N, 24.63; O, 16.69; S, 11.28. Found: C, 38.32; H, 6.39; N, 24.42; O, 11.10; S, 11.32.

EXAMPLE 43

2-(benzhydrylamino)-1-(2-imidazolin-2-yl)-2-imidazoline Hydroiodide

A solution of benzhydrylamine (9.1 g., 0.050 mole), 1-(2-imidazolin-2-yl)-2-(methylthio)-2-imidazoline hydroiodide (15.6 g., 0.005 mole) and acetonitrile (375 ml.) was heated under reflux for five hours while a stream of nitrogen was passed through the reaction mixture. The solution was allowed to cool to room temperature and the solid was collected. Recrystallization from 2-propanol gave 7.21 g. (32%) of the imidazoline, m.p. 255–256° dec.

*Analysis.*—Calcd. for $C_{19}H_{22}IN_5$: C, 51.02; H, 4.96; N, 15.66. Found: C, 50.99; H, 5.02; N, 15.95.

EXAMPLE 44

2-(3-nitrophenylamino)-1-(2-imidazolin-2-yl)-2-imidazoline Hydroiodide

A solution of *m*-nitroaniline (27.6 g., 0.200 mole), 1-(2-imidazolin-2-yl)-2-(methylthio)-2-imidazoline hydroiodide (62.4 g., 0.200 mole) and acetonitrile (1.5 l.) was heated under reflux for three days while a steady stream of nitrogen was bubbled through the reaction mixture. The solution was allowed to cool to room temperature. The solid was collected and recrystallized from acetone-water; yield 5.41 g. (6.8%) of the imidazoline, m.p. 269–270° dec.

*Analysis.*—Calcd. for $C_{12}H_{15}IN_6O_2$: C, 35.84; H, 3.76; I, 31.55; N, 20.90. Found: C, 35.91; H, 3.72; I, 31.35; N, 20.86.

EXAMPLE 45

2-(cyclohexylamino)-1-(2-imidazolin-2-yl)-2-imidazoline

A solution of cyclohexylamine (9.9 g., 0.100 mole), 1-(2-imidazolin-2-yl)-2-(methylthio)-2-imidazoline hydroiodide (31.2 g., 0.100 mole) and acetonitrile (500 ml.) was heated under reflux for four days while a steady stream of nitrogen was passed through the solution. The reaction mixture was evaporated. The residue was dissolved in water, basified with 1N sodium hydroxide solution and extracted with methylene chloride. The organic phase was dried over anhydrous sodium sulfate, filtered and evaporated. Trituration of the residue with acetone followed by recrystallization from acetonitrile gave 10.1 g. (44%) of the imidazoline, m.p. 165–166°.

*Analysis.*—Calcd. for $C_{12}H_{21}N_5$: C, 61.24; H, 8.73; N, 29.91. Found: C, 61.21; H, 9.00; N, 29.76.

EXAMPLE 46

11-{[1-(2-imidazolin-2-yl)-2-imidazolin-2-yl]amino} undecanoic acid

A solution of 11-aminoundecanoic acid (2.01 g., 0.0100 mole), 1-(2-imidazolin-2-yl)-2-(methylthio)-2-imidazoline hydrate (2.02 g., 0.0100 mole) and water (60 ml.) was heated under reflux for thirty minutes while a stream of nitrogen was passed through the reaction mixture. The solid was collected and recrystallized from water; yield 1.65 g. (49%) of the imidazoline, m.p. 181–182°.

*Analysis.*—Calcd. for $C_{17}H_{31}N_5O_2$: C, 60.50; H, 9.26; N, 20.76. Found: C, 60.54; H, 9.30; N, 20.56.

EXAMPLE 47

1-(2-imidazolin-2-yl)-2-(methylthio)-2-imidazoline hydrate

1 - (2 - imidazolin - 2 - yl) - 2 - (methylthio) - 2 - imidazoline hydroiodide (1.71 g., 0.00550 mole) was dissolved in water (30 ml.), basified with 5% sodium carbonate solution and extracted with methylene chloride. The organic extracts were dried over anhydrous sodium sulfate, filtered and evaporated. Recrystallization of the residue from 2-propanol gave 0.35 g. (34%) of the imidazoline hydrate, m.p. 115–119°.

*Analysis.*—Calcd. for $C_7H_{14}N_4OS$: C, 41.57; H, 6.98; N, 27.70; S, 15.85. Found: C, 41.55; H, 7.06; N, 27.72; S, 15.57.

EXAMPLE 48

1 - (2 - imidazolin - 2 - yl) - 2 - (methylthio) - 2 - imidazoline hydroiodide and 1-(2-imidazolin-2-yl)-2-(methylthio)-2-imidazoline hydroiodide methanethiol A solution of 2-(methylthio)-2-imidazoline (116 g., 1.00 mole), 2 - (methylthio) - 2 - imidazoline hydroiodide (244 g., 1.00 mole) and acetonitrile (700 ml.) was heated under reflux for 1.5 hours while a stream of nitrogen was passed through the reaction mixture. The solution was allowed to cool to room temperature and the precipitate was collected. Recrystallization from 2-propanol gave 25 g. (8.0%) of 1-(2-imidazolin-2-yl)-2-(methylthio)-2-imidazoline hydroiodide, m.p. 176–178° (resolidified) and 230–250° dec.

*Analysis.*—Calcd. for $C_7H_{13}IN_4S$: C, 26.93; H, 4.20; I, 40.65; N, 17.95. Found: C, 27.22; H, 4.16; I, 40.79; N, 17.84.

The filtrate was concentrated to a volume of 400 ml. and the precipitate was collected. Recrystallization from acetonitrile and 2-propanol gave 103 g. (29%) of 1-(2-imidazolin-2-yl)-2-(methylthio)-2-imidazoline hydroiodide methanethiol, m.p. 101–102°.

*Analysis.*—Calcd. for $C_8H_{17}IN_4S_2$: C, 26.67; H, 4.76; I, 35.22; N, 15.55; S, 17.80. Found: C, 26.82; H, 4.82; I, 35.16; N, 15.61; S, 17.79.

EXAMPLE 49

Triethyl[1-(2-imidazolin-2-yl)-2-imidazolin-2-yl] ammonium iodide hydroiodide methanethiol A solution of 2-(methylthio)-2-imidazoline hydroiodide (48.8 g., 0.200 mol), triethylamine (20.2 g., 0.200 mol) and redistilled (from calcium hydride) 2-propanol (300 ml.) was heated under reflux for two hours while a stream of nitrogen was slowly passed through the solution. The reaction mixture was allowed to cool to room temperature. The solid was collected and dried; yield, 19.2 g. (36.0%) of the quaternary salt; m.p. 168.0–172.0° C. and 230.0–240.0° C. dec.

An analytical sample obtained by repeated recrystallizations from 2-propanol had m.p. 169.0–172.0° C. and 230.0–240.0° C. dec.

*Analysis.*—For $C_{13}H_{29}I_2N_5S$: Calcd.: C, 28.85; H, 5.40; I, 46.89; N, 12.94; S, 5.92. Found: C, 28.98; H, 5.42; I, 46.76; N, 12.79; S, 5.94.

We claim:

1. A compound of the formula:

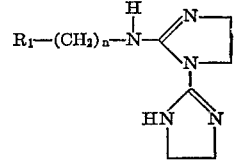

wherein *n* is 0 or 1; $R_1$ is hydrogen, n-alkyl of 2 to 16 carbon atoms, monocyclicalkyl of 3 to 12 carbon atoms, naphthyl or phenethyl or phenyl wherein the phenyl ring may be monosubstituted with lower alkoxy of 1 to 4 carbon atoms, hydroxy, lower alkyl of 1 to 4 carbon atoms, halo, nitro, trifluoromethyl or sulfamoyl or disubstituted with halo, lower alkoxy of 1 to 4 carbon atoms or hydroxy and when $n$ is 0, $R_1$ is adamantanyl, phenylcyclopropyl, diphenylmethyl, alpha, alpha-dimethylphenethyl, para-biphenyl or the group A—$CH_2CH_2$ wherein A is hydroxy, lower alkoxy of 1 to 4 carbon atoms, mercapto, lower alkylthio of 1 to 4 carbon atoms, methoxyethoxymethyl, hydroxyethylamino, lower alkoxymethyl of 1 to 4 carbon atoms, sulfomethyl or HOOC—$(CH_2)_8$ or a pharamaceutically acceptable acid addition salt thereof.

2. A compound of Claim 1 which is 2-[(3,4,-dimethoxyphenethyl)amino] - 1 - (2 - imidazolin-2-yl)-2-imidazoline hydroiodide.

3. A compound of Claim 1 which is 2-[3,4-dihydroxyphenethyl)amino] - 1 - (2-imidazolin-2-yl)-2-imidazoline hydrochloride.

4. A compound of Claim 1 which is 2-anilino-1-(2-imidazolin-2-yl)-2-imidazoline.

5. A compound of Claim 1 which is 2-(benzylamino)-1-(2-imidazolin-2-yl)-2-imidazoline hydroiodide.

6. A compound of Claim 1 which is 1-(2-imidazolin-2-yl) - 2 - [(trans-2-phenylcyclopropyl)amino]-2-imidazoline maleate.

7. A compound of Claim 1 which is 2-(cyclopropylamino)-1-(2-imidazolin-2-yl)-2-imidazoline hydroiodide.

8. A compound of Claim 1 which is 1-(2-imidazolin-2-yl)-2-(n-propylamino)-2-imidazoline hydroiodide.

9. A compound of Claim 1 which is 2-[(3-hydroxy-4-methoxyphenethyl)amino] - 1 - (2 - imidazolin-2-yl)-2-imidazoline hydroiodide.

10. A compound of Claim 1 which is 2-[(4-hydroxy-3-methoxyphenethyl)amino] - 1 - (2 - imidazolin-2-yl)-2-imidazoline hydroiodide.

11. A compound of Claim 1 which is 2-(adamanthylamino)-1-(2-imidazolin-2-yl)-2-imidazoline hydroiodide.

12. A compound of Claim 1 which is 1-(2-imidazolin-2-yl)-2-[(3 - phenylpropyl)amino] - 2 - imidazoline hydroiodide.

13. A compound of Claim 1 which is 1-(2-imidazolin-2-yl)-2-(veratrylamino)-2-imidazoline hydroiodide.

14. A compound of Claim 1 which is 2-(n-heptylamino)-1-(2-imidazolin-2-yl)-2-imidazoline hydroiodide.

15. A compound of Claim 1 which is 2-[(2,6-dichlorobenzyl)amino] - 1 - (2-imidazolin-2-yl)-2-imidazoline hydroiodide.

16. A compound of Claim 1 which is 2-(3,4-dimethoxyanilino) - 1 - (2 - imidazolin - 2-yl)-2-imidazoline hydroiodide.

17. A compound of Claim 1 which is 1-(2-imidazolin-2-yl)-2-(2-naphthylamino)-2-imidazoline.

18. A compound of Claim 1 which is 2-(n-heptadecylamino)-1-(2-imidazolin-2-yl)-2-imidazoline hydroiodide.

19. A compound of Claim 1 which is 2-(n-butylamino)-1-(2-imidazolin-2-yl)-2-imidazoline hydroiodide.

20. A compound of Claim 1 which is 2-(cyclododecylmethylamino)-1-(2-imidazolin-2-yl)-2-imidazoline hydroiodide.

21. A compound of Claim 1 which is 2-[(4-hydroxy-3 - methoxybenzyl)amino] - 1 - (2 - imidazolin-2-yl)-2-imidazoline hydroiodide.

22. A compound of Claim 1 which is 2-[(4-biphenylyl)amino]-1-(2-imidazolin-2-yl)-2-imidazoline.

23. A compound of Claim 1 which is 2-(p-hydroxyanilino)-1-(2-imidazolin-2-yl)-2-imidazoline hydroiodide.

24. A compound of Claim 1 which is 2-[(α,α-dimethylphenethyl)amino] - 1 - (2-imidazolin-2-yl)-2-imidazoline hydroiodide.

25. A compound of Claim 1 which is 2-[(2-ethoxyethyl)amino] - 1 - (2 - imidazolin - 2-yl)-2-imidazoline hydroiodide.

26. A compound of Claim 1 which is 2-amino-1-(2-imidazolin-2-yl)-2-imidazoline hydroiodide.

27. A compound of Claim 1 which is 2-{[2-(ethylthio) ethyl]amino} - 1-(2-imidazolin-2-yl)-2-imidazoline hydrochloride.

28. A compound of Claim 1 which is 2-{[1-(2-imidazolin - 2 - yl) - 2 - imidazolin - 2-yl]amino}ethanethiol hydrochloride.

29. A compound of Claim 1 which is 1-(2-imidazolin-2 - yl) - 2 - {[3 - (2 - methoxyethoxy)propyl]amino}-2-imidazoline hydroiodide.

30. A compound of Claim 1 which is 2-({2-[(2-hydroxyethyl)amino]ethyl}amino) - 1-(2-imidazolin-2-yl)-2-imidazoline dihydroiodide.

31. A compound of Claim 1 which is 2-[(2-hydroxyethyl)amino] - 1 - (2 - imidazolin-2-yl)-2-imidazoline hydroiodide.

32. A compound of Claim 1 which is 1-(2-imidazolin-2-yl)-2-[(3 - isopropoxypropyl)amino] - 2 - imidazoline hydroiodide.

33. A compound of Claim 1 which is 2-(benzhydrylamino)-1-(2-imidazolin-2-yl)-2-imidazoline hydroiodide.

34. A compound of Claim 1 which is 2-(3-nitrophenylamino)-1-(2-imidazolin-2-yl)-2-imidazoline hydroiodide.

35. A compound of Claim 1 which is 2-(cyclohexylamino)-1-(2-imidazolin-2-yl)-2-imidazoline.

36. A compound of Claim 1 which is 11-{[1-(2-imidazolin-2-yl)-2-imidazolin-2-yl]amino}undecanoic acid.

37. A compound of Claim 1 which is 2-[(cyclopropylmethyl)amino] - 1-(2-imidazolin-2-yl)-2-imidazoline hydroiodide.

38. A compound of Claim 1 which is 2-[(4-chlorophenethyl)amino] - 1 - (2-imidazolin-2-yl)-2-imidazoline hydroiodide.

39. A compound of Claim 1 which is 1-(2-imidazolin-2-yl)-2-(phenethylamino)-2-imidazoline hydroiodide.

40. A compound of Claim 1 which is 2-(n-decylamino)-1-(2-imidazolin-2-yl)-2-imidazoline hydroiodide.

41. A compound of Claim 1 which is 1-(2-imidazolin-2-yl)-2-(α,α,α-trifluoro-m-toluidine)-2-imidazoline.

42. A compound of Claim 1 which is 2-(cyclododecylamino)-1-(2-imidazolin-2-yl)-2-imidazoline hydroiodide.

43. A compound of Claim 1 which is 1-(2-imidazolin-2-yl)-2-(o-toluidino)-2-imidazoline hydroiodide.

44. A compound of Claim 1 which is α-{[1-(2-imidazolin - 2 - yl) - 2-imidazolin-2-yl]amino}-p-toluenesulfonamide hydrochloride.

45. A compound of Claim 1 which is 3-{[1-(2-imidazolin-2-yl)-2-imidazolin-2-yl]amino} propanesulfonic acid hemihydrate.

46. Triethyl[1 - (2-imidazolin-2-yl)-2-imidazolin-2-yl] ammonium iodide hydroiodide methanethiol.

References Cited
FOREIGN PATENTS

| | | | |
|---|---|---|---|
| 1,530,087 | 5/1968 | France | 260—309.6 |
| 1,016,514 | 1/1966 | Great Britain | 260—309.6 |

OTHER REFERENCES

McFarland et al.: Chem. Abst., vol. 72, No. 2508g (1970).

McKay et al.: Chem. Abst., vol. 46, column 9617 (1952).

NATALIE TROUSOF, Primary Examiner

U.S. Cl. X.R.

260—247.5, 293.7, 296 R; 424—248, 263, 267, 273